United States Patent
Tomlinson

(12) 
(10) Patent No.: US 6,686,410 B1
(45) Date of Patent: Feb. 3, 2004

(54) BLENDING OF POLYMERIC MATERIALS AND FILLERS

(75) Inventor: Richard W. Tomlinson, Watertown, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/646,841

(22) PCT Filed: Oct. 29, 1999

(86) PCT No.: PCT/US99/25626

§ 371 (c)(1),
(2), (4) Date: Nov. 10, 2000

(87) PCT Pub. No.: WO00/26279

PCT Pub. Date: May 11, 2000

Related U.S. Application Data

(60) Provisional application No. 60/106,827, filed on Nov. 3, 1998.

(51) Int. Cl.[7] ............... C08L 3/04; C08L 3/22; C08L 23/04

(52) U.S. Cl. .............. 524/495; 524/496; 524/497; 524/505; 524/515; 525/240; 525/241; 525/242

(58) Field of Search ............... 524/495, 496, 524/497, 505, 515; 525/240, 241, 242

(56) References Cited

U.S. PATENT DOCUMENTS

| | | | | |
|---|---|---|---|---|
| 4,032,501 A | * | 6/1977 | Schulz | 523/328 |
| 4,599,370 A | * | 7/1986 | Grossman et al. | 523/200 |

FOREIGN PATENT DOCUMENTS

| | | | | |
|---|---|---|---|---|
| EP | 0100434 A2 | * | 2/1984 | C08J/03/12 |
| GB | 1507691 | | 4/1978 | |
| GB | 1551382 | * | 8/1979 | |

* cited by examiner

*Primary Examiner*—Robert Deshon Harlan
(74) *Attorney, Agent, or Firm*—Daniel Reitenbach

(57) ABSTRACT

Disclosed are methods for the formation of a free flowing polymer/filler masterbatch powder, in which a polymer and filler are intimately mixed for a time and under shear conditions sufficient to convert the combination into a free flowing associated composition of polymer and filler.

20 Claims, No Drawings

BLENDING OF POLYMERIC MATERIALS AND FILLERS

CROSS-REFERENCES TO RELATED APPLICATIONS

This application claims the benefit of application Ser. No. 60/106,827 filed Nov. 3, 1998.

STATEMENT REGARDING FEDERALLY SPONSORED RESEARCH OR DEVELOPMENT

Not applicable.

BACKGROUND OF THE INVENTION

1. Field of the Invention

The present invention relates to the blending of polymeric materials and fillers to form free flowing particles.

2. Description of the Related Art

U.S. Pat. No. 5,552,457 is directed to a process for making resin-composite particulates of syndiotactic-1,2-polybutadiene and carbon black without using a conventional mixer. The carbon black and resin are mixed in an aqueous medium at an elevated temperature above the melting point or softening point of the resin, the medium is cooled and the masterbatch powder is recovered.

U.S. Pat. No. 3,920,604 is directed to a process for producing pourable, filler-containing polymer particles in which the polymer is dissolved in a volatile organic solvent, carbon black is added to the dissolved polymer, and the solvent is flash evaporated.

U.S. Pat. No. 4,994,534 is directed to the formation of sticky polymers in which the polymerization is said to take place at a temperature in excess of the softening temperature of the polymer, and in the presence of a particulate material having a mean particle size of from about 0.01 to about 10 micron meters.

BRIEF SUMMARY OF THE INVENTION

In one aspect, the present invention relates to a method for the formation of a free flowing polymer/filler masterbatch powder, which method comprises intimately mixing a polymer and a filler for a time and under shear conditions sufficient to convert the components into a free flowing associated composition of polymer and filler.

In another aspect, the present invention relates to the product of the method set forth above.

In yet another aspect, the present invention relates to a molded or extruded article made from the product set forth above.

DETAILED DESCRIPTION OF THE INVENTION

The present invention provides a means for forming a free flowing blend of a polymeric material and a filler. Suitable polymeric materials include both natural rubber and synthetic rubbers. Synthetic rubbers include, but are not limited to, for example, ethylene/alpha-olefin/non-conjugated polyene (EPDM) rubbers, ethylene/alpha-olefin (EPR) rubbers, styrene/butadiene rubbers, acrylonitrile/butadiene (NBR) rubbers, polychloroprene rubbers, polybutadiene rubbers, isobutylene-isoprene copolymers, etc. The polymeric component also includes mixtures of two or more different polymeric materials. In a preferred embodiment, the polymeric material, prior to blending, is substantially or completely free of filler material.

Suitable fillers include any filler conventionally used in polymer compounding, including carbon black, hydrated amorphous silica, diatomaceous earth, talc, calcium carbonate, etc., and may include mixtures of two or more different fillers.

The powders according to the present invention may have a weight ratio of polymer to filler from about 1:0.15 to about 1:10, preferably from about 1:0.15 to about 1:1.5, depending on the constituent materials and the application therefor.

The polymer/filler powders of the present invention may be processed by well known means into, e.g., various types of end product molded or extruded articles, including tires, hoses, roof sheeting, weatherstripping, belts, wire and cable covers, etc., and may contain other conventional additives such as processing aids, antioxidants, antiozonants, etc.

The powders of the present invention may be formed by subjecting the desired amounts of polymer and filler, preferably in a substantially dry state, to shear conditions in an internal mixer such as Brabenders, continuous screw extruders, Banburys, etc. and for a time sufficient to form the powder. For present purposes, a dry state is defined as free from polymerization medium solvents and/or water. In a preferred embodiment, the polymer and filler are blended in a mixer, preferably for about 1 to about 5 minutes. As will be demonstrated more fully below, the quality of the powder may be controlled by varying a number of parameters, including the volume loading of the mixer, mixing temperature, mixing time, mixing shear stress, and the blend ratio of the polymer and filler. In certain embodiments, the filler and/or polymer may additionally comprise an extender oil.

The following non-limiting examples are illustrative of the processes and products of the present invention.

TABLE 1. EXAMPLES 1–4

TABLE 1

|  | Example | | | |
| --- | --- | --- | --- | --- |
|  | 1 | 2 | 3 | 4 |
| ROYALENE ® 3275:N-650 | 1:1.5 | 1:1.5 | 1:1.5 | 1:1.5 |
| Volume Loading, % | 71 | 66 | 62 | 57 |
| Torque, m-gm | 270 | 95 | 35 | 22 |
| Sieve Size | Wt % of Particles Retained | | | |
| #8 | 39 | 0 | 0 | 0 |
| #20 | 32 | 25 | 6 | 7 |
| #30 | 29 | 75 | 94 | 93 |
| Non-Sintering Rating | 2 | 2 | 1–2 | 1 |

In these examples, it is demonstrated that a free flowing particle that will not agglomerate under normal conditions may be formed from a blend of a polymer and carbon black. The polymer used was ROYALENE® 3275 (Uniroyal Chemical Co., Middlebury, Conn.) which is an EPDM having a Mooney viscosity (ML 1+4 @ 125° C.) of 60, an ethylene/propylene ratio of 57/43 and an ethylidene norbornene content of 2%. The carbon black was N-650 from Cabot Corp. The designated amounts of EPDM and N-650 were charged to a Brabender mixer with a mixing capacity of 65 cc. The carbon black was added first, followed by solid pieces of the EPDM polymer. The mixing unit is heated to 65° C., and the blend is mixed at 50 rpm for 5 minutes under a ram pressure of 40 psi. The temperature and the torque (m-gm) are recorded at the end of the 5 minute mix. The lower the final temperature and torque, the higher the amount of small particles which produce an excellent non-sintering rating.

The weight ratio of polymer to carbon black in Examples 1–4 is held constant at 1:1.5, and the volume loading was varied between 57 and 71 percent. Volume was calculated based on the EPDM density (0.86 g/cc) and the carbon black density (1.8 g/cc).

After mixing, the ingredients are removed from the mixer and the particle size distribution is determined by sieving through a series of U.S.A. Standard Sieves series (ASTM designation E11) of the following sizes: #4 (0.187 inch), #5 (0.157 inch), #8 (0.094 inch), #20 (0.033 inch) and #30 (0.023 inch). The percentage of particles retained on each sieve size is calculated by weight. The results are presented in Table 1.

In examples 1–4 the particle size distribution shows that as the volume loading and mixing torque decreases, the amount of smaller size particles increases. At the start of the mix the temperature and torque value increases, but after several minutes both will decrease as the particles are formed. Examples 3 and 4 give the maximum percentage of small particles between a volume loading of 57% to 62%. Examples 1 and 2 at 66% and 71% volume loading give lower amounts of small particles. These examples clearly show that a specific volume loading is required to give the smallest rubber/carbon black particle.

The product produced in Example 4, which is comprised primarily of #30 size particles, was evaluated in a non-sintering test and was found to give an excellent rating of 1. Polypropylene and polyethylene commercial resins in pellet form were used as control samples, and they both had a rating of 2 under the same test conditions.

The sintering test is performed as follows. A piece of 2 inch×2 inch I.D. square tubing 4 inches long is capped off on one end to contain the sample. A weighted ram is a piece of 1-⅞ inch×1-⅞ inch O.D. square tubing capped off on one end and of sufficient length to contain the necessary weights, in this instance 1037 grams. Fifty grams of material to be tested is poured into the base of the first tube. The weighted ram is placed on the material, and the entire unit is placed in an oven for 5 days at 120° F. After the 5 days, the ram is removed, and the sample is evaluated according to the following ratings: 1=excellent (loose and free flowing); 2=good (slightly packed, flows out with slight probe); 3=fair (packed, but breaks up easily); 4=poor (packed, but breaks up with effort); and 5=bad (packed, will not break up except with extreme effort).

Table 2. Examples 5–7

TABLE 2

|  | Example | | |
| --- | --- | --- | --- |
|  | 5 | 6 | 7 |
| ROYALENE ® 3275:N-650 | 1:1 | 1:1 | 1:1 |
| Volume Loading, % | 56 | 50 | 40 |
| Torque, m-gm | 300 | 25 | 11 |
| Sieve Size | Wt % of Particles Retained | | |
| #8 |  | 6 | 1 |
| #20 |  | 33 | 19 |
| #30 |  | 61 | 80 |
| Non-Sintering Rating | (a) | 2 | 1 |

(a) Ingredients massed together; no particles formed.

In this series, the ratio of ROYALENE® 3275 EPDM and N-650 carbon black was held constant at 1:1 and the volume loading was varied between 40% and 56%. These were mixed under the same conditions used in examples 1–4. The results in Table 2 show that example 5, at a volume loading of 56%, had a high torque value of 300 m-gm and the blend massed together. Example 7, at the loading of 40%, produced the highest percentage of smaller particles (19% of #20 and 80% of #30) and it had a non-sintering rating of 1.

Table 3. Examples 8–10

TABLE 3

|  | Example | | |
| --- | --- | --- | --- |
|  | 8 | 9 | 10 |
| ROYALENE ® 3275:N-650 | 1:0.5 | 1:0.5 | 1:0.5 |
| Volume Loading, % | 50 | 44 | 35 |
| Torque, m-gm | 170 | 40 | 12 |
| Sieve Size | Wt % of Particles Retained | | |
| #8 |  | 68 | 10 |
| #20 |  | 30 | 35 |
| #30 |  | 2 | 55 |
| Non-Sintering Rating | (a) | 3 | 1, 2 |

(a) Ingredients massed together; no particles formed.

In this series, the ratio of ROYALENE® 3275 EPDM and N-650 carbon black was held constant at 1:0.5 and the volume loading varied between 35% and 50%. These were mixed under the same conditions used in examples 1–4. The results in Table 3 show that example 8, at a loading of 50%, massed together. Examples 9 and 10, at volume loading between 35% and 44%, yield the largest percentage of smaller particles. Example 10 was tested twice and had non-sintering ratings of 1 and 2.

Table 4. Examples 11–12

TABLE 4

|  | Example | |
| --- | --- | --- |
|  | 11 | 12 |
| ROYALENE ® 3275:N-650 | 1:0.25 | 1:0.25 |
| Volume Loading, % | 39 | 32 |
| Torque, m-gm | 24 | 11 |
| Sieve Size | Wt % of Particles Retained | |
| #8 | 45 | 10 |
| #20 | 51 | 49 |
| #30 | 4 | 41 |
| Non-Sintering Rating | — | 3 |

In this series, the ratio of ROYALENE® 3275 EPDM and N-650 carbon black was held constant at 1:0.25 and the volume loading varied between 32% and 39%. These were mixed under the same conditions used in examples 1–4. The results in Table 4 show that example 12, at 32% loading, has the largest percentage of smaller particles.

The data in examples 1–12 clearly show that the relationship between the blend ratio and volume loading to produce a small particle blend of EPDM and N-650 carbon black. As the EPDM:N-650 blend ratio decreases, a lower volume loading is required to produce the largest amount of the small particles.

Table 5. Examples 13–14

TABLE 5

|  | Example | |
|---|---|---|
|  | 13 | 14 |
| ROYALENE ® 3275:N-650 | 1:0.5 | 1:0.5 |
| Volume Loading, % | 49 | 34 |
| Mixing Power, KW | 0.5 | 0.1 |
| Sieve Size | Wt % of Particles Retained | |
| #4 |  | 4 |
| #5 |  | 4 |
| #8 |  | 13 |
| #20 |  | 34 |
| #30 |  | 45 |
| Non-Sintering Rating | (a) | 1–2 |

(a) Ingredients massed together; no particles formed.

In this series, the blend ratio of ROYALENE® 3275 EPDM and N-650 carbon black was held constant at 1:0.5 and the volume loading varied between 34% and 49%. Mixing was done in a Farrel Banbury mixer, Model BR 1600 with a capacity of 1570 cc for comparison with data generated in examples 8–10 which were mixed in a 65 cc Brabender unit. The carbon black and polymer were added to the Banbury mixer which was preheated to 65° C. The ram was closed and the blend was mixed at a rotor speed of 100 rpm for 5 minutes. The kilowatts of power were recorded at the end of the mix. The resulting particles were removed, cooled to room temperature, and sieved. The data on these mixes are tabulated in Table 5. Example 13, at the loading of 49%, did not form a particulate product but massed together. Example 19 did form particles at the lower volume loading. Example 14 at a 34% volume loading had the maximum amount of smaller particle sizes. The results in example 10 using the smaller Brabender mixer indicated that the optimum loading was 35%. Since the volume loadings are similar in both the 65 cc and a 1570 cc mixer, it indicates that this process can be scaled up in larger mixing equipment with similar results.

To further illustrate the invention, the product from example 14 was sieved into particle sizes. Non-sintering results show that the larger particle sizes have poor ratings, whereas the smaller particles have good ratings as shown below:

| Sieve Size | #4 | #5 | #8 | #20 | #30 |
|---|---|---|---|---|---|
| Rating | 5 | 5 | 3 | 2 | 2 |

Table 6. Examples 15–16

TABLE 6

|  | Example | |
|---|---|---|
|  | 15 | 16 |
| BJLT-M50:N-650 | 1:1.5 | 1:1.5 |
| Volume Loading, % | 65 | 50 |
| Torque, m-gm | 350 | 5 |
| Sieve Size | Wt % of Particles Retained | |
| #4 | 1 | 0 |
| #5 | 3 | 0 |
| #8 | 7 | 0 |
| #20 | 27 | 3 |
| #30 | 62 | 97 |
| Non-Sintering Rating | — | 3 |

This series utilizes PARACRIL® BJLT-M50 (Uniroyal Chemical Company, Inc., Middlebury, Conn.), a nitrile polymer with a Mooney viscosity (ML 1+4 @ 125° C.) of 50, an acrylonitrile content of 32.6% and a density of 0.99 g/cc. The same mixing procedure of examples 1–4 is used. The blend ratio of BJLT-M50 and N-650 carbon black was held constant at 1:1.5 and the volume loading varied between 50% and 65%. The data in Table 6 show that the volume loading at 50% gives the largest percentage of smaller particle sizes. Example 16 had a non-sintering rating of 3 (fair).

Table 7. Examples 17–20

TABLE 7

|  | Example | | | |
|---|---|---|---|---|
|  | 17 | 18 | 19 | 20 |
| BJLT-M50:N-650 | 1:1 | 1:1 | 1:05 | 1:0.25 |
| Volume Loading, % | 50 | 40 | 30 | 25 |
| Torque, m-gm | 480 | 4 | 160 | 100 |
| Sieve Size | Wt % of Particles Retained | | | |
| #4 |  | 0 |  |  |
| #5 |  | 0 |  |  |
| #8 |  | 0 |  |  |
| #20 |  | 21 |  |  |
| #30 |  | 79 |  |  |
| Non-Sintering Rating | (a) | 3 | (a) | (a) |

(a) Ingredients massed together; no particles formed.

In examples 17 and 18, the blend ratio of BJLT and N-650 carbon black is held constant at 1:1 and the volume loading is varied between 40% and 50%. The same mixing procedure in examples 1–4 was used. The data in Table 7 show that Example 17 at the 50% volume loading did not produce any particulates and the ingredients massed together. Example 18 at the lower loading of 40% did produce a large percentage of small particles. Example 18 had a non-sintering rating of 3 (fair).

In examples 19–20, the blend ratios of BJLT-M50 and N-650 are held at 1:05 and 1:0.25. The same mixing procedure in examples 1–4 is used. The data in Table-7 show that both example 19 at a ratio of 1:0.5 and a volume loading of 30% and example 20 at a blend ratio of 1:0.25 at a volume loading of 25% massed together and did not form a particulate material.

The data in examples 15–20 show that the present invention can be used with an NBR polymer to produce a free flowing particulate material at an NBR:N-650 blend ratio higher than 1:0.5.

Table 8. Examples 21–22

TABLE 8

|  | Example | |
|---|---|---|
|  | 21 | 22 |
| SBR-1502:N-650 | 1:1.5 | 1:1.5 |
| Volume Loading, % | 70 | 55 |
| Torque, m-gm | 80 | 10 |
| Sieve Size | Wt % of Particles Retained | |
| #4 | 0 | 0 |
| #5 | 0 | 0 |
| #8 | 0 | 0 |
| #20 | 32 | 5 |
| #30 | 68 | 95 |
| Non-Sintering Rating | — | 2 |

This series utilizes SBR-1502 (Copolymer Corp.), a styrene-butadiene polymer with a Mooney viscosity (ML 1+4 @ 100° C.) of 52, a bound styrene content of 23.5%, and a density of 0.93 g/cc. The same mixing procedure in examples 1–4 was used. The SBR-1502:N-650 carbon black blend ratio was held constant at 1:1.5 and the volume loading varied between 55% and 70%. The data in Table 8 show that the smaller particle sizes are maximized between 55% and 70% volume loading. Example 22 had a non-sintering rating of 2 (good).

Table 9. Examples 23–24

TABLE 9

|  | Example | |
|---|---|---|
|  | 23 | 24 |
| SBR-1502:N-650 | 1:1 | 1:1 |
| Volume Loading, % | 55 | 45 |
| Torque, m-gm | 120 | 2 |
| Sieve Size | Wt % of Particles Retained | |
| #4 | 24 | 0 |
| #5 | 6 | 0 |
| #8 | 18 | 0 |
| #20 | 28 | 17 |
| #30 | 24 | 83 |
| Non-Sintering Rating | — | 2 |

In this series, the SBR-1502:N-650 blend ratio is held constant at 1:1 and the volume loading varied between 45% and 55%. The same mixing procedure in examples 1–4 was used. The data in Table 9 show that the smaller particles are maximized around a volume loading of 45%. Example 24 had a non-sintering rating of 2 (good).

Table 10. Examples 25–26

TABLE 10

|  | Example | |
|---|---|---|
|  | 25 | 26 |
| SBR-1502:N-650 | 1:0.5 | 1:0.5 |
| Volume Loading, % | 45 | 40 |
| Torque, m-gm | 190 | nil |

TABLE 10-continued

|  | Example | |
|---|---|---|
|  | 25 | 26 |
| Sieve Size | Wt % of Particles Retained | |
| #4 |  | 0 |
| #5 |  | 0 |
| #8 |  | 10 |
| #20 |  | 43 |
| #30 |  | 47 |
| Non-Sintering Rating | (a) | 3 |

(a) Ingredients massed together; no particles formed.

In this series, the SBR-1502:N-650 blend ratio is held constant at 1:0.5 and the volume loading varied between 40% and 45%. The same mixing procedure in examples 1–4 was used. The data in Table 10 show that example 25 at a 45% volume loading masses together. Example 26 at a volume loading of 40% produces the highest percentage of smaller particles. Example 26 had a non-sintering rating of 3 (fair).

Table 11. Examples 27–28

TABLE 11

|  | Example | |
|---|---|---|
|  | 27 | 28 |
| SBR-1502:N-650 | 1:0.25 | 1:0.25 |
| Volume Loading, % | 45 | 40 |
| Torque, m-gm | 140 | 2 |
| Sieve Size | Wt % of Particles Retained | |
| #4 | (a) | 8 |
| #5 | (a) | 12 |
| #8 | (a) | 31 |
| #20 | (a) | 30 |
| #30 | (a) | 19 |

(a) Ingredients massed together; no particles formed.

In this series, the SBR-1502:N-650 blend ratio is held constant at 1:0.25 and the volume loading varied between 40% and 45%. The same mixing procedure in examples 1–4 was used. The data in Table 11 show that example 27 at a volume loading of 45% masses together. A volume loading of 40% gives the highest percentage of smaller particles (example 28).

Table 12. Examples 29–32

TABLE 12

|  | Example | | | |
|---|---|---|---|---|
|  | 29 | 30 | 31 | 32 |
| Butyl 065:N-650 | 1:1.5 | 1:1.5 | 1:1 | 1:1 |
| Volume Loading, % | 50 | 45 | 40 | 35 |
| Torque, m-gm | 160 | 1 | 180 | 5 |
| Sieve Size | Wt % of Particles Retained | | | |
| #4 |  | 0 |  | 0 |
| #5 |  | 0 |  | 1 |
| #8 |  | 2 |  | 14 |

TABLE 12-continued

|  | Example | | | |
|---|---|---|---|---|
|  | 29 | 30 | 31 | 32 |
| #20 |  | 29 |  | 35 |
| #30 |  | 69 |  | 50 |
| Non-Sintering Rating | (a) | 2 | (a) | 3 |

(a) Ingredients massed together; no particles formed.

Examples 29–30 utilize Butyl 065 (Exxon), an isobutylene-isoprene copolymer, with a Mooney viscosity (ML 1+8 @ 100° C.) of 45, an unsaturation of 0.8 mole percent, and a density of 0.92 g/cc. The same mixing procedure in examples 1–4 is used. The Butyl 065:N-650 blend ratio is evaluated at 1:1.5. The volume loading is varied between 45% and 50%. The data in Table 12 show that the highest percentage of particulate material is produced at a volume loading of 45%. Example 30 had a non-sintering rating of 2 (good).

Examples 31–32 utilize Butyl 065 and carbon black at a blend ratio of 1:1. The volume loading is varied between 35% and 40%. The data in Table 12 show that the highest percentage of particulate material is produced at a volume loading of 35%. Example 32 had a non-sintering rating of 3 (fair).

Table 13. Examples 33–36

TABLE 13

|  | Example | | | |
|---|---|---|---|---|
|  | 33 | 34 | 35 | 36 |
| Butyl 065:N-650 | 1:0.5 | 1:0.5 | 1:0.25 | 1:0.25 |
| Volume Loading, % | 45 | 40 | 50 | 45 |
| Torque, m-gm | 140 | 3 | 110 | 0 |
| Sieve Size | Wt % of Particles Retained | | | |
| #4 |  | 8 |  | 4 |
| #5 |  | 7 |  | 3 |
| #8 |  | 21 |  | 16 |
| #20 |  | 28 |  | 37 |
| #30 |  | 36 |  | 40 |
| Non-Sintering Rating | (a) | 3 | (a) | 4 |

(a) Ingredients massed together; no particles formed.

Examples 33–34 utilize Butyl 065 and carbon black at a blend ratio of 1:0.5. The volume loading is varied between 40% and 45%. The data in Table 13 show that the higher percentage of particulate material is produced at a loading of 40%. Example 34 had a non-sintering rating of 3 (fair).

Examples 35–36 utilize Butyl 065 and carbon black at a blend ratio of 1:0.25. The volume loading was varied between 45% and 50%. The data in Table 13 show that the higher percentage of particulate material is produced at a loading of 45%. Example 36 had a non-sintering rating of 4 (poor).

Table 14. Examples 37–38

TABLE 14

|  | Example | |
|---|---|---|
|  | 37 | 38 |
| Cisdene 1203:N-650 | 1:0.5 | 1:0.5 |
| Volume Loading, % | 60 | 50 |
| Torque, m-gm | 185 | 0 |
| Sieve Size | Wt % of Particles Retained | |
| #4 |  | 0 |
| #5 |  | 0 |
| #8 |  | 5 |
| #20 |  | 30 |
| #30 |  | 65 |
| Non-Sintering Rating | (a) | 4 |

(a) Ingredients massed together; no particles formed.

This series utilizes Cisdene 1203 (American Synthetic Rubber), a cis-polybutadiene polymer with a Mooney viscosity (ML 1+4 @ 100° C.) of 45 and a specific gravity of 0.91 g/cc. The blends were mixed in the same procedure as in examples 1–4. The Cisdene 1203:N-650 carbon black ratio was held constant at 1:0.5 and the volume loading varied between 50% and 60%. The data in Table 14 show that example 37 at the higher volume loading of 60% massed together within the mixer. Example 38 at a loading of 50% gave the best distribution of particles.

Table 15. Examples 39–42

TABLE 15

|  | Example | | | |
|---|---|---|---|---|
|  | 39 | 40 | 41 | 42 |
| ROYALENE ® 3275:Austin Black | 1:1.5 | 1:1.5 | 1:0.5 | 1:0.5 |
| Volume Loading, % | 50 | 35 | 40 | 25 |
| Torque, m-gm | 110 | nil | 22 | nil |
| Sieve Size | Wt % of Particles Retained | | | |
| #4 |  |  |  | 3 |
| #5 |  | 2 |  | 5 |
| #8 |  | 11 |  | 32 |
| #20 |  | 31 |  | 37 |
| #30 |  | 56 |  | 23 |
| Non-Sintering Rating | (a) | 2 | (a) | 3 |

(a) Ingredients massed together; no particles formed.

In examples 39 and 40, the ratio of ROYALENE® 3275 and Austin Black (ground coal) was held constant at 1:1.5 and the volume loading varied between 35% and 50%. These were mixed under the same conditions used in examples 1–4. The results in Table 15 show that example 39, at a volume loading of 50%, had a high torque value of 110 m-gm and the blend massed together. Example 40 at a volume loading of 35% had a non-sintering rating of 2.

In examples 41 and 42, the ratio of ROYALENE® 3275 and Austin Black (ground coal) was held constant at 1:0.5 and the volume loading varied between 25% and 40%. These were mixed under the same conditions used in examples 1–4. The results in Table 15 show that example 41, at a volume loading of 40%, massed together. Example 42 at a volume loading of 25% gave the largest percentage of smaller particles and it had a non-sintering rating of 3.

Table 16. Examples 43–46

TABLE 16

|  | Example | | | |
|---|---|---|---|---|
|  | 43 | 44 | 45 | 46 |
| ROYALENE ® 3275:Mistron Vapor | 1:1 | 1:1 | 1:0.5 | 1:0.5 |
| Volume Loading, % | 30 | 25 | 30 | 25 |
| Torque, m-gm | 55 | 0 | 30 | 0 |
| Sieve Size | Wt % of Particles Retained | | | |
| #4 |  |  | 3 | 7 |
| #5 |  |  | 7 | 8 |
| #8 |  |  | 22 | 30 |
| #20 |  |  | 30 | 33 |
| #30 |  |  | 41 | 22 |
| Non-Sintering Rating | (a) | 2 | (a) | 2 |

(a) Ingredients massed together; no particles formed.

In examples 43 and 44, the blend ratio of ROYALENE® 3275 and Mistron Vapor (magnesium silicate) was held constant at 1:1 and the volume loading varied between 25% and 30%. These were mixed under the same conditions used in examples 1–4. The results in Table 16 show that example 43, at a volume loading of 30%, massed together. Example 44 at a volume loading of 25% gave a non-sintering rating of 2.

In examples 45 and 46, the blend ratio of ROYALENE® 3275 and Mistron Vapor (magnesium silicate) was held constant at 1:0.5 and the volume loading varied between 25% and 30%. These were mixed under the same conditions used in examples 1–4. The results in Table 16 show that example 45, at a 30% volume loading, masses together. Example 46 at a volume loading of 25% gave a non-sintering rating of 2.

Table 17. Examples 47–50

TABLE 17

|  | Example | | | |
|---|---|---|---|---|
|  | 47 | 48 | 49 | 50 |
| ROYALENE ® 3275:Paragon Clay | 1:1.5 | 1:1.5 | 1:0.5 | 1:0.5 |
| Volume Loading, % | 35 | 30 | 35 | 25 |
| Torque, m-gm | 55 | Nil | 80 | Nil |
| Sieve Size | Wt % of Particles Retained | | | |
| #4 |  | 0 |  | 0 |
| #5 |  | 0 |  | 2 |
| #8 |  | 4 |  | 6 |
| #20 |  | 28 |  | 36 |
| #30 |  | 68 |  | 56 |
| Non-Sintering Rating | (a) | 2 | (a) | 3 |

(a) Ingredients massed together; no particles formed.

In examples 47 and 48, the blend ratio of ROYALENE® 3275 and Paragon Clay (hydrated aluminum silicate) was held constant at 1:1.5 and the volume loading varied between 30% and 35%. These were mixed under the same conditions used in examples 1–4. The results in Table 17 show that example 47, at a volume loading of 35%, massed together. Example 48 at a volume loading of 30% gave a non-sintering rating of 2.

In examples 49 and 50, the blend ratio of ROYALENE® 3275 and Paragon Clay (hydrated aluminum silicate) was held constant at 1:0.5 and the volume loading varied between 25% and 35%. These were mixed under the same conditions used in examples 1–4. The results in Table 17 show that example 49, at a volume loading of 35%, masses together. Example 50 at a volume loading of 25% gave a free flowing particulate with a non-sintering rating of 3.

Table 18. Examples 51–54

TABLE 18

|  | Example | | | |
|---|---|---|---|---|
|  | 51 | 52 | 53 | 54 |
| ROYALENE ® 3275:Atomite | 1:1.5 | 1:1.5 | 1:0.5 | 1:0.5 |
| Volume Loading, % | 40 | 25 | 35 | 30 |
| Torque, m-gm | 100 | nil | 65 | Nil |
| Sieve Size | Wt % of Particles Retained | | | |
| #4 |  | 4 |  | 1 |
| #5 |  | 5 |  | 1 |
| #8 |  | 24 |  | 14 |
| #20 |  | 23 |  | 55 |
| #30 |  | 44 |  | 29 |
| Non-Sintering Rating | (a) | 2 | (a) | 3 |

(a) Ingredients massed together; no particles formed.

In examples 51 and 52, the blend ratio of ROYALENE® 3275 and Atomite (calcium carbonate) was held constant at 1:1.5 and the volume loading varied between 25% and 40%. These were mixed under the same conditions used in examples 1–4. The results in Table 18 show that example 51, at a volume loading of 40%, masses together. Example 52 at a volume loading of 25% gave a free flowing particulate with a non-sintering rating of 2.

In examples 53 and 54, the blend ratio of ROYALENE® 3275 and Atomite (calcium carbonate) was held constant at 1:0.5 and the volume loading varied between 30% and 35%. These were mixed under the same conditions used in examples 1–4. The results in Table 18 show that example 53, at a volume loading of 35%, masses together. Example 54 at a volume loading of 30% gave a free flowing particulate with a non-sintering rating of 3.

Table 19. Examples 55–58

TABLE 19

|  | Example | | | |
|---|---|---|---|---|
|  | 55 | 56 | 57 | 58 |
| ROYALENE ® 3275:HiSil 243 | 1:1.5 | 1:1.5 | 1:0.5 | 1:0.25 |
| Volume Loading, % | 60 | 55 | 25 | 25 |
| Torque, m-gm | 700 | nil | nil | Nil |
| Sieve Size | Wt % of Particles Retained | | | |
| #4 |  | 0 | 0 | 1 |
| #5 |  | 0 | 1 | 2 |
| #8 |  | 0 | 8 | 16 |
| #20 |  | 9 | 36 | 44 |
| #30 |  | 91 | 55 | 37 |
| Non-Sintering Rating | (a) | 1 | 2 | 2 |

(a) Ingredients massed together; no particles formed.

In examples 55 and 56, the blend ratio of ROYALENE® 3275 and HiSil 243 (precipitated, hydrated amorphous silica) was held constant at 1:1.5 and the volume loading varied between 55% and 60%. These were mixed under the same conditions used in examples 1–4. The results in Table 19 show that example 55 at a volume loading of 60% masses together. Example 56 at a volume loading of 55% gave a free flowing particulate with a non-sintering rating of 1.

In examples 57 and 58, the volume loading of ROYALENE® 3275 and HiSil 243 (precipitated, hydrated amorphous silica) was held constant at 25% and the blend ratio varied between 1:0.5 and 1:0.25. These were mixed under the same conditions used in examples 1–4. The results in Table 19 show that example 57 at a blend ratio of 1:0.5 gave a free flowing particle with a non-sintering rating of 2. Example 58 at a blend ratio of 1:0.25 gave a free flowing particulate with a non-sintering rating of 2.

Table 20. Examples 59–61

TABLE 20

| | Example | | |
|---|---|---|---|
| | 59 | 60 | 61 |
| ROYALENE ® 3275:N-650 | 1:0.1 | 1:0.15 | 1:0.2 |
| Volume Loading, % | 30 | 30 | 30 |
| Torque, m-gm | nil | nil | nil |
| Sieve Size | Wt % of Particles Retained | | |
| #4 | 1 | 1 | 1 |
| #5 | 2 | 3 | 2 |
| #8 | 26 | 21 | 17 |
| #20 | 54 | 49 | 51 |
| #30 | 17 | 26 | 29 |
| Non-Sintering Rating | 5 | 4 | 3 |

In this series, the volume loading of ROYALENE® 3275 and N-650 is held constant at 30% and the blend ratio is varied between 1:0.1 and 1:0.2. The same mixing procedure of examples 1–4 is used. The results in Table 20 show that example 59 at a blend ratio of 1:0.1 gives a particulate material, but it has a non-sintering rating of 5. Example 60 was prepared at a blend ratio of 1:0.15, and its particles have a non-sintering ratio of 4. Example 61 was prepared at a blend ratio of 1:0.2, and its particles have a non-sintering rating of 3.

TABLE 21

| Example | ROYALENE ® :N-650 | Non-Sintering Rating |
|---|---|---|
| 59 | 1:0.10 | 5 |
| 60 | 1:0.15 | 4 |
| 61 | 1:0.20 | 3 |
| 12 | 1:0.25 | 3 |
| 10 | 1:0.50 | 1, 2 |

The data in Table 21 clearly show that the lowest blend ratio limit of this invention that shows an improvement in the non-sintering rating is 1:0.15.

Table 22. Examples 62–64

TABLE 22

| | Example | | |
|---|---|---|---|
| | 62 | 63 | 64 |
| ROYALENE ® 3275:N-650 | 1:0.5 | 1:0.5 | 1:0.5 |
| Volume Loading, % | 35 | 35 | 35 |
| Mixing Temperature, ° C. | 40 | 65 | 85 |
| Torque, m-gm | 35 | 12 | 0 |
| Sieve Size | Wt % of Particles Retained | | |
| #4 | 51 | 0 | 0 |
| #5 | 10 | 0 | 0 |
| #8 | 24 | 10 | 9 |
| #20 | 14 | 35 | 38 |

TABLE 22-continued

| | Example | | |
|---|---|---|---|
| | 62 | 63 | 64 |
| #30 | 1 | 55 | 53 |
| Non-Sintering Rating | — | 1, 2 | 2 |

In this series, the blend ratio of ROYALENE® 3275 and N-650 is held constant at 1:0.5, the volume loading is held constant at 35%, and the mixing temperature is varied at 40° C. and 85° C. The same mixing procedure in examples 1–4 is used. The data in Table 22 show that example 62 at 40° C. did produce a particulate material, but has the highest amount of larger size particles. Example 63 mixed at a temperature of 65° C. had a high level of smaller particle sizes with a non-sintering rating of 1–2. Example 64 was mixed at 85° C., and had a high level of smaller size particles and had a non-sintering rating of 2.

Table 23. Examples 65–69

TABLE 23

| | Example | | | | |
|---|---|---|---|---|---|
| | 65 | 66 | 67 | 68 | 69 |
| ROYALENE ® 3275:N-650 | 1:1 | 1:1 | 1:1 | 40 | 1:1 |
| Volume Loading, % | 40 | 40 | 40 | 40 | 40 |
| Mixing Time, minutes | 0.75 | 1 | 2 | 3 | 4 |
| Torque, m-gm | 200 | 200 | 30 | nil | nil |
| Sieve Size | Wt % of Particles Retained | | | | |
| #4 | 74 | 63 | 2 | 0 | 0 |
| #5 | 4 | 5 | 2 | 0 | 0 |
| #8 | 8 | 12 | 7 | 2 | 1 |
| #20 | 9 | 14 | 32 | 20 | 19 |
| #30 | 5 | 6 | 57 | 78 | 80 |

In this series, the blend ratio of ROYALENE® 3275 and N-650 is held constant at 1:1, the volume loading is held constant at 40%, and the mixing time is varied at 0.75, 1, 2, 3, and 4 minutes. The same mixing procedure in examples 1–4 was used. The data in Table 23 show that longer mixing times give a larger amount of smaller particle sizes. Example 67 takes 2 minutes to achieve a distribution of 32% of #20 size particles and 57% of #30 size particles.

Table 24. Examples 70–74

TABLE 24

| | Example | | | | |
|---|---|---|---|---|---|
| | 70 | 71 | 72 | 73 | 74 |
| ROYALENE ® 3275:N-650 | 1:0.5 | 1:0.5 | 1:0.5 | 1:0.5 | 1:0.5 |
| Volume Loading, % | 35 | 35 | 35 | 35 | 35 |
| Mixing Time, minutes | 0.75 | 1 | 2 | 3 | 4 |
| Torque, m-gm | 100 | 100 | 12 | Nil | nil |
| Sieve Size | Wt % of Particles Retained | | | | |
| #4 | 71 | 74 | 10 | 0 | 0 |
| #5 | 3 | 3 | 3 | 1 | 1 |
| #8 | 9 | 8 | 15 | 8 | 5 |
| #20 | 11 | 11 | 38 | 38 | 34 |
| #30 | 6 | 4 | 34 | 53 | 60 |

In this series, the blend ratio of ROYALENE® 3275 and N-650 is held constant at 1:0.5, the volume loading is held constant at 35%, and the mixing time is varied at 0.75, 1, 2, 3, and 4 minutes. The same mixing procedure in examples 1–4 was used. The data in Table 25 show that longer mixing times give a larger amount of smaller particle sizes. Example 73 takes 3 minutes to achieve a distribution of 38% of #20 size particles and 53% of #30 size particles.

The data in examples 70–74 show that longer mixing times are beneficial for producing a smaller size particulate. Blend ratios that are lower in carbon black content require more mixing time to produce a specific particle size distribution.

Table 25. Examples 75–76

TABLE 25

|  | Example | |
|---|---|---|
|  | 75 | 76 |
| ROYALENE ® 3275:Statex MRG-P | 1:1.5 | 1:1.5 |
| Volume Loading, % | 35 | 30 |
| Torque, m-gm | 90 | 0 |
| Sieve Size | Wt % of Particles Retained | |
| #4 | (a) | 0 |
| #5 | (a) | 0 |
| #8 | (a) | 10 |
| #20 | (a) | 32 |
| #30 | (a) | 52 |

(a) Ingredients massed together; no particles formed.

In this series, the blend ratio of ROYALENE® 3275 and Statex MRG-P is held constant at 1:1.5, and the mixer volume loading is varied between 30% and 35%. Statex MRG-P is composed of 100 phr N-650 carbon black and 50 phr of Sunpar 2280 oil. The same mixing procedure in examples 1–4 is used. The data in Table 25 show that example 75 at a volume loading of 35% did not form a free flowing particulate.

Example 76 at a volume loading of 30% did form a free flowing particulate composed of 32% of #20 size particles and 58% of #30 size particles.

These data show that oil is to a degree detrimental in this process but under the proper mixing conditions, a free flowing material could be possible.

Table 26. Examples 77–80

TABLE 26

|  | Example | | | |
|---|---|---|---|---|
|  | 77 | 78 | 79 | 80 |
| ROYALENE ® X4070:Filler Package A | 1:1.5 | 1:1.5 | — | — |
| ROYALENE ® X4234:Filler Package B | — | — | 1:1.4 | 1:1.4 |
| Volume Loading, % | 60 | 50 | 55 | 50 |
| Torque, m-gm | 360 | nil | 320 | Nil |
| Sieve Size | Wt % of Particles Retained | | | |
| #4 |  | 0 |  | 0 |
| #5 |  | 0 |  | 0 |
| #8 |  | 0 |  | 0 |
| #20 |  | 15 |  | 27 |
| #30 |  | 85 |  | 73 |
| Non-Sintering Rating | (a) | 2 | (a) | — |

(a) Ingredients massed together; no particles formed.

In this series, ROYALENE® X70, an experimental EPDM having a Mooney viscosity of 62, an ethylene/propylene ratio of 70/30, and ENB of 2%, is mixed with a filler package that might be used in actual applications. Filler Package A is composed of 150 phr of the following ingredients (N-650, N-330, Austin Black, and Paragon Clay). Examples 77 and 78 are blends of ROYALENE® X70 and Filler Package A at a ratio of 1:1.5 mixed at a volume loading between 50% and 60%. Example 77 at a volume loading of 60% masses together. Example 78 at a volume loading of 50% gives a free flowing particle with a non-sintering rating of 2. Examples 79 and 80 are blends of ROYALENE® X34, an experimental EPDM having a Mooney viscosity (ML 1+4 @ 100° C.) of 65, an ethylene/propylene weight ratio of 60/40, and ENB % of 8.5, and Filler Package B at a ratio of 1:1.4 mixed at a volume loading between 50% and 55%. Filler Package B is composed of 140 phr of the following ingredients (N-660, N-550, and Whiting). Example 79 at a volume loading of 55% masses together. Example 80 at a volume loading of 50% gives a free flowing particulate with 73% of #30 size particles.

Table 27. Examples 81–83

TABLE 27

|  | Example | | |
|---|---|---|---|
|  | 81 | 82 | 83 |
| SMR-CV60:N-650 | 1:1.5 | 1:1.5 | 1:1.5 |
| Volume Loading, % | 66 | 62 | 57 |
| Torque, m-gm | 114 | 74 | 79 |
| Sieve Size | Wt % of Particles Retained | | |
| #4 | 0 | 0 | 0 |
| #5 | 0 | 0 | 0 |
| #8 | 1 | 1 | 1 |
| #20 | 35 | 31 | 35 |
| #30 | 64 | 68 | 64 |
| Non-Sintering Rating | 2 | 2 | 2 |

In this series, Natural Rubber, SMR-CV-60 with Mooney viscosity 60 was used. The ratio of SMR-CV-60 to Carbon Black N650 was kept constant 1:1.5, and the volume loading varied between 66% and 57%. The mixing procedure was the same as in examples 1–4. In all three cases, samples with non-sintering test rating of 2 were obtained.

Table 28. Example 84

TABLE 28

|  | Example 84 |
|---|---|
| TRILENE ® 77:N-650 | 1:1.5 |
| Volume Loading, % | 53 |
| Torque, m-gm | 11 |
| Sieve Size | Wt % of Particles Retained |
| #4 | 0 |
| #5 | 0 |
| #8 | 1 |
| #20 | 13 |
| #30 | 86 |
| Non-Sintering Rating | 1 |

In this example, TRILENE® 77 was used which is an EPDM produced by Uniroyal Chemical. The nominal composition of TRILENE® 77 is: E/P weight ratio 75/25, % ENB 9.5, and its GPC weight average molecular weight is 40,000. The ratio of TRILENE® to Carbon Black N650 was 1:1.5 and the volume loading was 53%. The non-sintering test shows an excellent rating of 1. The mixing conditions were the standard, except that the temperature of the Brabender was 23° C. instead of 65° C.

Table 29. Examples 85–88

TABLE 29

|  | Example | | | |
|---|---|---|---|---|
|  | 85 | 86 | 87 | 88 |
| Solflex 1216:N-650 | 1:1.5 | 1:2.33 | 1:4 | 1:9 |
| Volume Loading, % | 57 | 57 | 45 | 33 |
| Torque, m-gm | 20 | 120 | 130 | 83 |
| Sieve Size | Wt % of Particles Retained | | | |
| #4 | 0 | 0 | 0 | 0 |
| #5 | 0 | 0 | 0 | 0 |
| #8 | 0 | 0 | 1 | 2 |
| #20 | 3 | 4 | 12 | 19 |
| #30 | 97 | 96 | 87 | 79 |
| Non-Sintering Rating | 2 | 1 | 2 | 2 |

In this case, Solflex 1216 (Goodyear Chemicals) a solution-SBR with a Mooney viscosity (ML 1+4 @ 100° C.) of 90 and a bound styrene content of 10% was used. The ratio of Sulflex 1216 to Carbon Black N650 was varied from 1:1.5 to 1:9, and the volume loading was adjusted in each case, as Table 23 shows. The mixing procedure was the same as in examples 1–4 of ROYALENE® 3275 with carbon black.

Table 30. Examples 89–91

TABLE 30

|  | Example | | |
|---|---|---|---|
|  | 89 | 90 | 91 |
| SBR-1502:N-650 | 1:1.5 | 1:4 | 1:9 |
| Volume Loading, % | 57 | 45 | 33 |
| Torque, m-gm | 20 | 130 | 83 |
| Sieve Size | Wt % of Particles Retained | | |
| #4 | 0 | 0 | 0 |
| #5 | 0 | 0 | 0 |
| #8 | 0 | 0 | 12 |
| #20 | 5 | 9 | 13 |
| #30 | 95 | 91 | 75 |
| Non-Sintering Rating | 2 | 1 | 1 |

In this series, the weight ratio of SBR-1502:N-650 was varied from 1:1.5 to 1:9, while the volume loading varied from 57% to 33%. The mixing procedure was the same as in examples 1–4. Example 91 shows that it is possible to use very high levels of carbon filler; i.e., 900 parts per 100 parts of SBR-1502, with excellent non-sintering rate of 1.

Example 92

In this case, blending trials were conducted with a ZSK-40 twin screw extruder, of Werner and Pfleiderer Co., with an experimental EPDM, ROYALENE® X70, having a Mooney viscosity (ML 4+1 @ 125° C.) of 62, an ethylene/propylene ratio of 70/30, and an ENB content of 2%, and N-650 carbon black to create a free flowing mixture.

The ROYALENE® X70 product was supplied as condensed bales which were cut into strips and granulated to feed the extruder via an Acrison feeder. The carbon black material was similarly fed to the extruder.

The extrusion process operating parameters varied in these trials included raw material feed rates and ratios, screw design, screw speed and barrel temperature, and screw profiles. The blend ratio of EPDM:carbon black was varied from 1:0.5 to 1:1.

Example 92, a typical case from these trials in a twin screw extruder, the free flowing associated composition of EPDM:N-650 ratio of 1:0.8, had a non-sintering rating of 3. This example demonstrates the ability to produce the products of this invention also in continuous screw extruders.

The present invention has been described in considerable detail with reference to the importance of the polymer:filler blend ratio and mixer volume loading, but other changes in the mixing procedure may impact on this invention. Anyone skilled in the art of rubber compounding can vary other parameters, such as, the type and size of the mixer, type of mixer rotors, mixing temperature, mixing time, type of grade of polymer, type of carbon black or other filler may also impact on the outcome of this invention. Therefore the spirit and scope of our claims should not be limited to the description of the preferred versions contained herein.

What is claimed is:

1. A method for the formation of a free flowing polymer/filler powder, which method comprises intimately mixing in an internal mixer a polymer and a filler wherein the volume loading of said internal mixer is in a range of from 25 to 71 percent for a time of from one to five minutes under shear conditions sufficient to convert the components into a free flowing associated composition of polymer and filler.

2. The method of claim 1, wherein the polymer is selected from the group consisting of natural rubber and synthetic rubbers.

3. The method of claim 2, wherein the polymer is natural rubber.

4. The method of claim 2, wherein the synthetic rubber is selected from the group consisting of EPDM rubber, EPR rubber, styrene/butadiene rubber, acrylonitrile/butadiene (NBR) rubber, polychloroprene, polybutadiene rubber, isobutylene-isoprene copolymer, and mixtures thereof.

5. The method of claim 4, wherein the polymer is an EPDM rubber.

6. The method of claim 4, wherein the polymer is a nitrile rubber.

7. The method of claim 4, wherein the polymer is a styrene-butadiene rubber.

8. The method of claim 4, wherein the polymer is a polybutadiene rubber.

9. The method of claim 1, wherein the filler is selected from the group consisting of carbon black, hydrated amorphous silica, diatomaceous earth, talc, calcium carbonate, and mixtures thereof.

10. The method of claim 9, wherein the filler is carbon black.

11. The method of claim 1, wherein the filler or the rubber additionally comprises an extender oil.

12. The method of claim 1, wherein the weight ratio of polymer to filler is from about 1:0.15 to about 1:10.

13. The method of claim 11, wherein the weight ratio of polymer to filler is from about 1:0.15 to about 1:1.5.

14. The method of claim 1, wherein the polymer is substantially free of filler prior to said mixing and wherein the polymer is in a substantially dry state prior to said mixing.

15. The method of claim 1, wherein the polymer comprises a mixture of at least two different polymers.

16. The method of claim 1, wherein the filler comprises a mixture of at least two different fillers.

17. The product of the method of claim 1.

18. A molded or extruded article made from the product of claim 17.

19. A molded or extruded article according to claim 18, wherein the polymer is selected from the group consisting of natural rubber and synthetic rubbers.

20. A molded or extruded article according to claim 18, wherein the article is selected from the group consisting of a tire, a hose, roof sheeting, weather-stripping, a belt, and a wire and cable cover.

* * * * *